(12) United States Patent
Moffitt et al.

(10) Patent No.: US 9,688,395 B2
(45) Date of Patent: Jun. 27, 2017

(54) BOUNDARY LAYER INGESTING BLADE

(71) Applicant: Sikorsky Aircraft Corporation, Stratford, CT (US)

(72) Inventors: Blake Almy Moffitt, South Windsor, CT (US); Thomas G. Tillman, West Hartford, CT (US); Brian E. Wake, South Glastonbury, CT (US); Byung-Young Min, Manchester, CT (US); Claude G. Matalanis, Longmeadow, MA (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 258 days.

(21) Appl. No.: 14/096,541

(22) Filed: Dec. 4, 2013

(65) Prior Publication Data

US 2015/0152733 A1   Jun. 4, 2015

(51) Int. Cl.
    *F01D 5/14*   (2006.01)
    *B64C 27/82*  (2006.01)
    *B64C 11/18*  (2006.01)

(52) U.S. Cl.
    CPC ............. *B64C 27/82* (2013.01); *B64C 11/18* (2013.01); *B64C 2027/8236* (2013.01); *F01D 5/14* (2013.01)

(58) Field of Classification Search
    CPC .................. B64C 27/467; B64C 11/18; B64C 2027/8236; F02D 5/148; F01D 5/141
    See application file for complete search history.

(56) References Cited

U.S. PATENT DOCUMENTS

| 3,241,791 | A  | 3/1966  | Piasecki |
|-----------|----|---------|----------|
| 3,463,417 | A  | 8/1969  | Cruz |
| 6,948,910 | B2 | 9/2005  | Polacsek |
| 7,251,592 | B1 | 7/2007  | Praisner et al. |
| 7,320,575 | B2 | 1/2008  | Wadia et al. |
| 7,549,604 | B2 * | 6/2009 | Hutterer ................ B64D 27/02 244/54 |
| 7,600,976 | B2 * | 10/2009 | Bagai ...................... B64C 27/10 416/223 R |
| 7,641,144 | B2 | 1/2010  | Kummer et al. |
| 7,686,567 | B2 | 3/2010  | Grover et al. |
| 7,854,593 | B2 | 12/2010 | Owen |
| 7,926,759 | B2 | 4/2011  | Muylaert et al. |
| 8,172,540 | B2 | 5/2012  | Owen |
| 8,286,909 | B2 | 10/2012 | Lee |
| 8,366,399 | B2 | 2/2013  | Allen-Bradley et al. |

(Continued)

OTHER PUBLICATIONS

International Search Report issued in PCT/US2014/067140; mailed Mar. 10, 2015, 7 pages.

(Continued)

*Primary Examiner* — Brian M O'Hara
(74) *Attorney, Agent, or Firm* — Cantor Colburn LLP (57) ABSTRACT

A boundary layer ingesting (BLI) blade having a span is provided and includes a root section connectable to a hub, a tip section disposable at a distance from the hub and having a pitch and a body extending in a spanwise dimension from the root section to the tip section. The root section has a local pitch from the root section to about a 70% span location, which is less than the pitch at the tip section, to thereby reduce local angles of attack in a boundary layer region defined in and around the root section.

16 Claims, 7 Drawing Sheets

(56) References Cited

U.S. PATENT DOCUMENTS

| | | |
|---|---|---|
| 2005/0045762 A1 | 3/2005 | Pham |
| 2006/0269418 A1 | 11/2006 | Bagai |
| 2010/0193644 A1 | 8/2010 | Karem |
| 2012/0107130 A1 | 5/2012 | Lin |

OTHER PUBLICATIONS

Written Opinion issued in PCT/US2014/067140; mailed Mar. 10, 2015, 6 pages.

* cited by examiner

BOUNDARY LAYER INGESTING BLADE

BACKGROUND OF THE INVENTION

The subject matter disclosed herein relates to a boundary layer ingesting blade and, more particularly, to a boundary layer ingesting blade of a compound helicopter.

Propellers are often designed in isolation where ideal inflow conditions are assumed, such as a case in which the free stream airflow velocity upstream of the propeller is uniform and constant. This assumption is often useful since most propellers are used in a tractor configuration where they are disposed upstream of fuselage or a wing and the assumption relatively closely approximates the physics of a tractor propeller. When a propulsor propeller or fan is placed in the wake of a body (i.e., fuselage, wing, strut, etc.), the propulsor propeller or fan is no-longer operating in its design environment and its performance will likely be degraded.

BRIEF DESCRIPTION OF THE INVENTION

According to one aspect of the invention, a boundary layer ingesting (BLI) blade having a span is provided and includes a root section connectable to a hub, a tip section disposable at a distance from the hub and having a twist and a body extending in a spanwise dimension from the root section to the tip section. The root section has a local twist from the root section to about a 70% span location, which is greater than the twist at the tip section, to thereby adjust local angles of attack in a boundary layer region defined in and around the root section.

According to another aspect of the invention, a compound helicopter is provided and includes a fuselage including a rotor section and a tail section, a main rotor blade disposed at the rotor section and configured to rotate relative to the fuselage to provide a lift force and a pusher propeller disposed at the tail section and configured to rotate relative to the fuselage to provide thrust. The pusher propeller includes a blade. The blade includes a root section connectable to a hub, a tip section at a distance from the hub and having a twist and a body extending in a spanwise direction from the root section to the tip section. The root section has a local twist from the root section to about a 70% span location, which is greater than the twist at the tip section to thereby adjust local angles of attack in a boundary layer region defined in and around the root section.

According to another aspect of the invention, a method of designing a boundary layer ingesting (BLI) blade having a span is provided and includes forming a tip section to be remote from the hub and a body extending in a spanwise dimension from the root section to the tip section, the tip section having a twist and forming a root section connectable to the hub and having a local twist which is greater than the pitch, the root section being up to about a 70% span location with the local twist thereby adjusting local angles of attack in a boundary layer region defined in and around the root section.

According to yet another aspect of the invention, a method of designing a boundary layer ingesting (BLI) blade is provided. The BLI blade includes a root section, a tip section and a body extending spanwise from the root section to the tip section and the method includes initially designing the BLI blade to have a twist distribution of approximately thirty degrees at an approximate 20% span location, approximately zero degrees at an approximate 75% span location and approximately negative eight degrees at an approximate 100% span location, analyzing expected boundary layer flows of the BLI blade in a boundary layer region defined in an around the root section and applying a linear twist perturbation to the initially designed BLI blade from the approximate 20% span location to the approximate 100% span location in accordance with results of the analysis to adjust local angles of attack in the boundary layer region.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
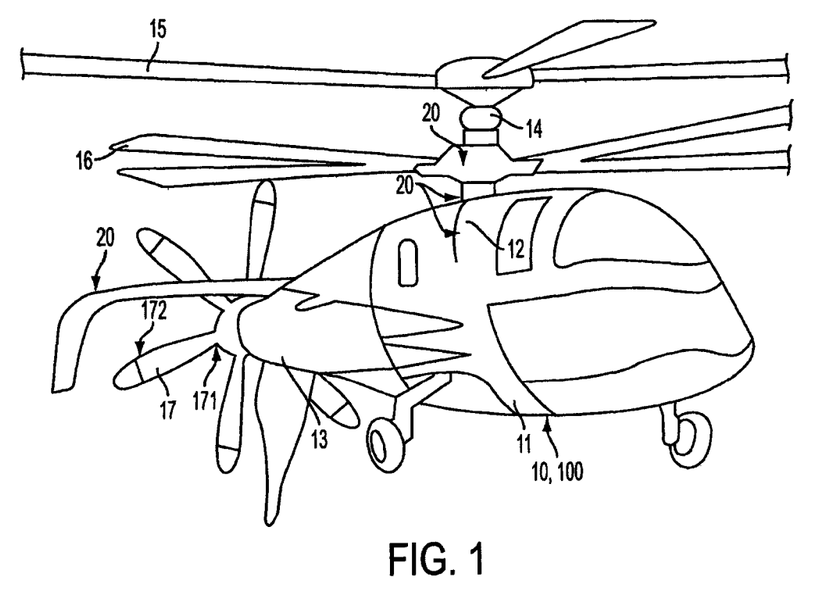
FIG. 1 is a perspective view of a rotormachine in accordance with embodiments.

With reference to FIG. 1, a rotormachine 10 is provided. The rotormachine 10 includes a fuselage 11 that is formed to define an interior cabin in which a pilot and passengers may be situated. The fuselage 11 includes a rotor section 12 at a top portion thereof and a tail section 13 at a trailing end thereof. The rotor section 12 is supportive of a main rotor shaft 14 that is rotatable about its longitudinal axis relative to the fuselage 11. The main rotor shaft 14 is respectively coupled to coaxial main rotor blades 15 and 16, which rotate with the main rotor shaft 14 to provide a lift force for the rotormachine 10. The tail section 13 is supportive of a propeller shaft (not shown) that is rotatable about a longitudinal axis thereof relative to the fuselage 11 and in a plane defined transversely with respect to a rotational plane of the main rotor shaft 14. The propeller shaft is coupled to a pusher (or propulsor) propeller 17, which rotates with the propeller shaft, to provide thrust to the rotormachine 10. As illustrated, the rotormachine 10 is a compound helicopter 100 although it is to be understood that the illustration is merely exemplary and that the description provided herein may be applicable to various rotormachines and helicopter designs as well as gas or steam engine turbines.

With the pusher propeller 17 disposed in the tail section 13, the pusher propeller 17 is disposed aft of several wake inducing features 20 of the fuselage 11. Indeed, the fuselage 11 is itself may be provided as an axisymmetric wake inducing element.

Figure 2:
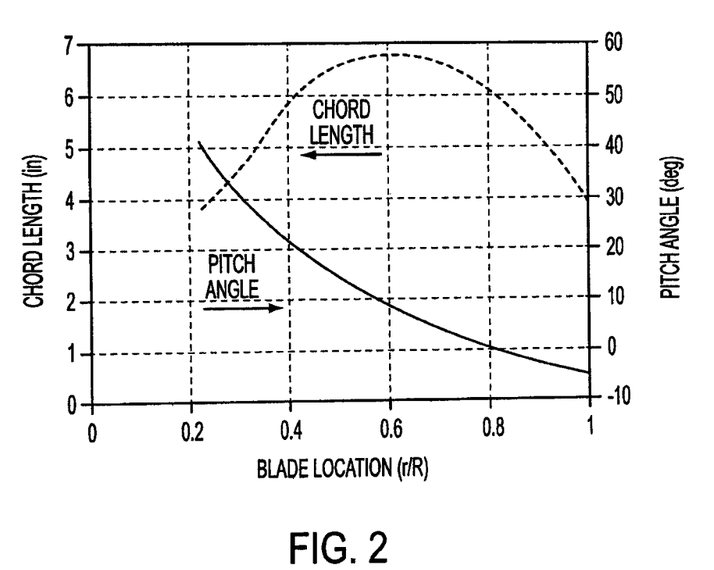
FIG. 2 is a graphical depiction of a local pitch (or twist) angle and chord length of a current propeller.

The chord and local pitch or twist distribution given in FIG. 2 may be provided for at least a portion of a propeller to be used as the pusher propeller 17 of FIG. 1. In accordance with previous designs, the propeller may be designed with the assumption of ideal inflow conditions such as a case in which the free stream airflow velocity upstream of the propeller is uniform and constant. As shown, the chord length reaches a peak between the ends of the blade, while the pitch angle reduces along the length of the blade. When operating in isolation, the propeller is designed so that local inflow angles stay between 1 and 7 degrees at the design operating point, which is near optimal for typical airfoils.

Figure 3:
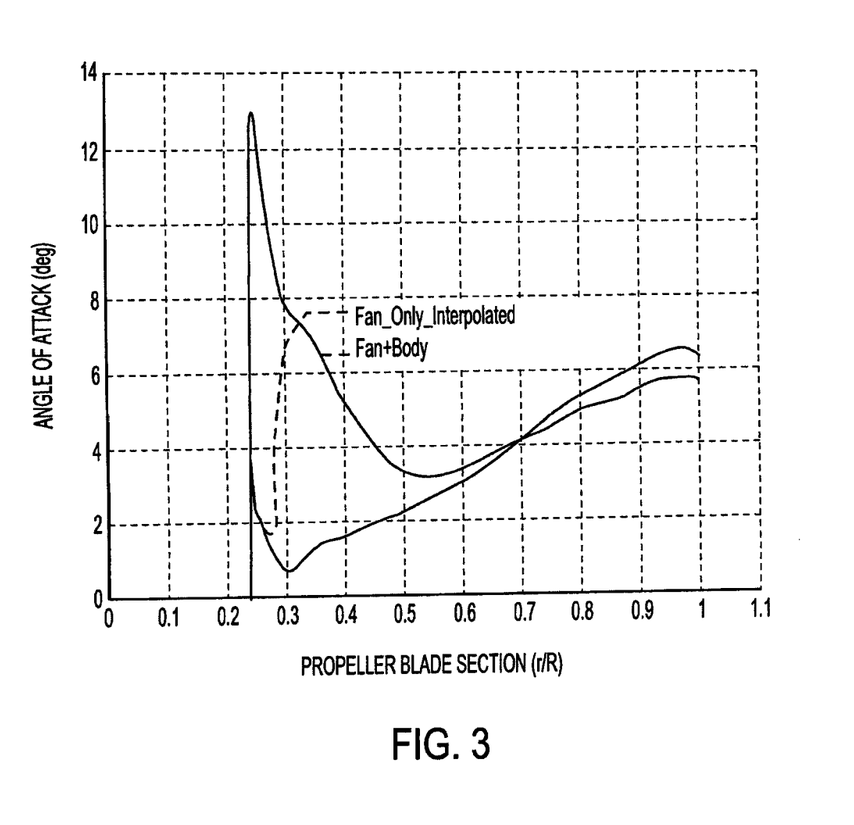
FIG. 3 is a graphical depiction of local airfoil incidence angles for a propeller operating in isolation and the same propeller operating in the wake of the axisymmetric body.

A velocity profile of an axisymmetric body, which is similar to the fuselage shapes used in high speed rotorcraft or aircraft designs, such as the wake inducing fuselage 11 of FIG. 1 will illustrate decreases in velocities that result in the wake of the body. When a propeller is located at the aft end of the body, as in the pusher propeller 17 of FIG. 1 relative to the fuselage 11, the wake induced by, e.g., the fuselage 11, causes local inflow angles to drastically increase near the root of the propeller blade, as shown in FIG. 3. For purposes of clarity and brevity, FIG. 3 includes a graphical depiction of local inflow angles between 1 and 7 degrees under assumed ideal conditions (Fan_Only_Interpolated) and local inflow angles when a wake is present and causes the local inflow angles to drastically increase (Fan+Body). As shown, under the ideal conditions, the angle of attack at the root section 31 (see FIG. 7) is roughly 3 degrees assuming no body is present to produce a boundary layer, but is roughly 13 degrees when such a body exists and a boundary layer is produced. Although this increase in angle of attack produces a loading that can increase overall propeller efficiency, it may be non-ideal for the airfoils used in the propeller design of the pusher propeller 17 of FIG. 1.

Figure 5:
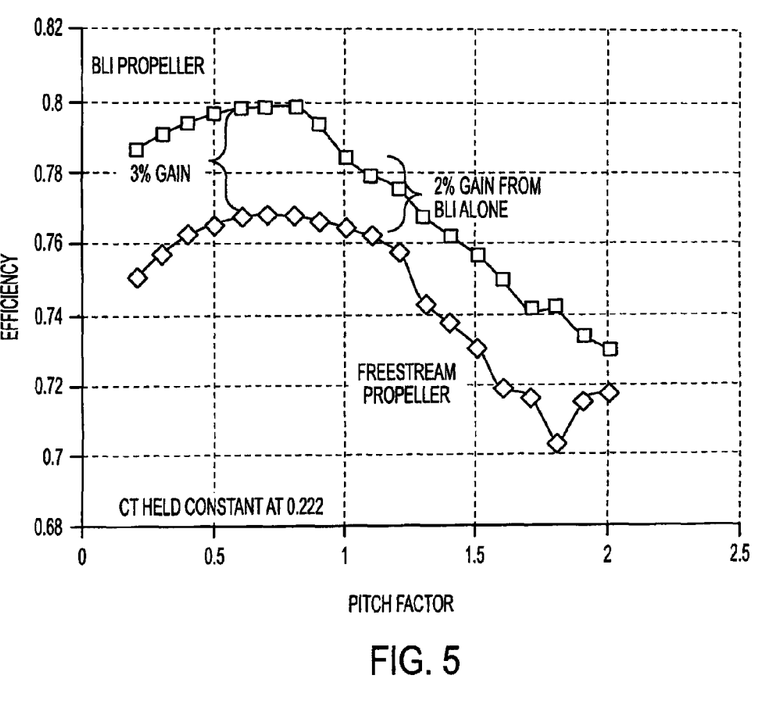
FIG. 5 is a graphical depiction of a BLI propeller optimization study showing that reducing local blade pitch using a pitch factor will provide an increased efficiency benefit.
Figure 6:
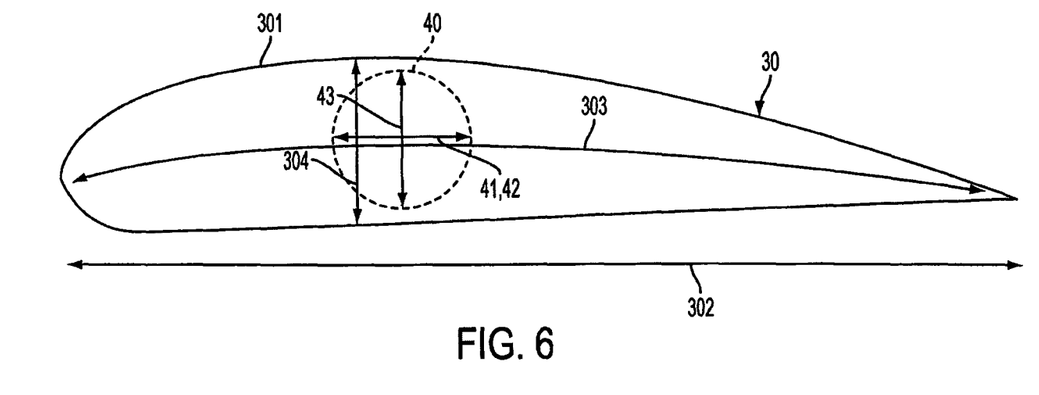
FIG. 6 is a schematic illustration of an increase in propeller blade chord length, camber and thickness in accordance with embodiments.
Figure 7:
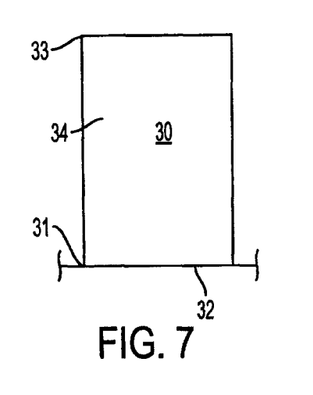
FIG. 7 is an axial view of the propeller blade of FIG. 6.

In accordance with aspects of the invention and with reference to FIGS. 4-7, a boundary layer ingesting (BLI) blade 30 (see FIGS. 6 and 7) is proposed for use with the pusher propeller 17 of FIG. 1 and any other similar feature of a rotormachine or helicopter or a gas or steam turbine engine. As shown in FIG. 7, the BLI blade 30 includes a root section 31 where the BLI blade 30 connects to a hub 32, a tip section 33 disposable at a distance and remote from the hub 32 and a body 34 that extends in a spanwise dimension from the root section 31 to the tip section 33. As will be discussed below, the aerodynamic geometry of the BLI blade 30 is modified from previous designs to thereby efficiently take advantage of the reduced velocities that exist in the above-noted wake. Depending on the various size and flow characteristics of the wake, the BLI blade 30 can offer an increased efficiency of >1%.

The BLI blade 30 is designed to take advantage of the reduced inflow along the fuselage 11 (see FIG. 1) and includes geometry that is tailored to operate in the wake or disturbances caused by the wake inducing features 20 and/or the fuselage 11. In accordance with embodiments, a local twist of the BLI blade 30 at the root section 31 to about the 70% span location is greater than a twist at the tip section 33. This modification helps adjust the local angles of attack in the boundary layer region 171 (see FIG. 1) in and around the root section 31 and provides improved propeller loading as the propeller loading transfers from the boundary layer region to the free stream inflow region 172 (see FIG. 1), which is defined along a central portion of the body 34.

Figure 4:
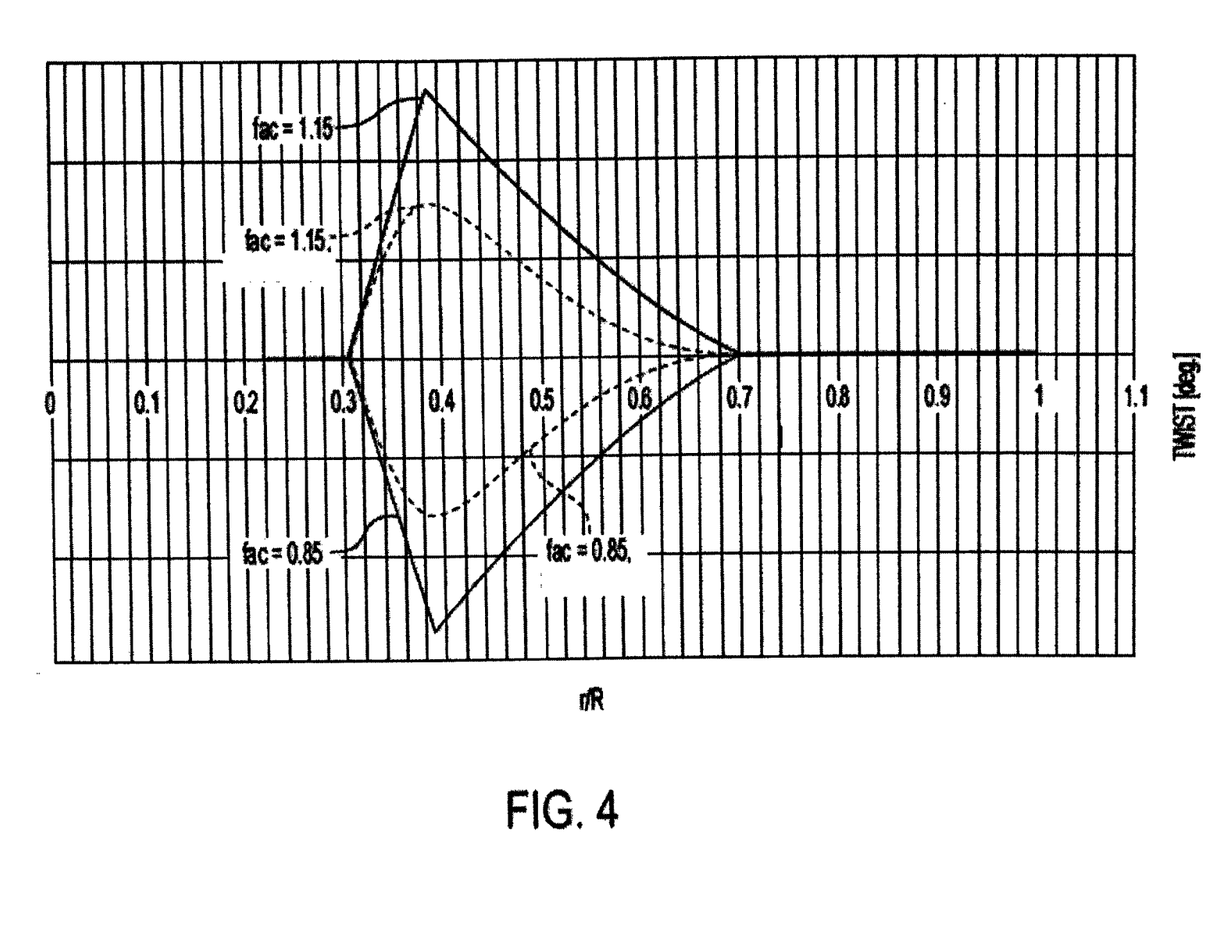
FIG. 4 is a graphical depiction of twist factor definition showing how a BLI propeller pitch (or twist) distribution is modified from the root out to the 70% spanwise propeller blade location in accordance with embodiments.

FIG. 4 provides a graphical depiction of a twist factor definition used to adjust and modify the local pitch angles of the BLI blade 30. Twist factors less than 1 (i.e., fac=0.85) reduce the twist of the BLI blade 30 while factors greater than 1 (i.e., fac=1.15) increase the twist. A twist factor of 1 represents no change to the twist distribution. As shown, the twist relative to the tip section is gradually decreased from the highest point close to the root to roughly 70% of the span.

FIG. 5 is a graphical depiction of a performance of a propeller according to previous design (i.e., the "Freestream Propeller" at a pitch factor of 1) and the BLI blade 30 with both being optimized for the same thrust loading coefficient. As shown in FIG. 5, a reduction in the pitch of the "Freestream Propeller" produces very little change in efficiency. This suggests that the "Freestream Propeller" is operating very close to optimum when isolated from the influence of any bodies (per the design condition). Adding the effect of the axisymmetric body wake, however, leads to an efficiency benefit of about 2% for the BLI blade 30. Moreover, as the twist at the root section 31 increases, the efficiency increases and optimizes with about a 3% increase in efficiency for the BLI blade 30 at slightly more than the 0.5 pitch factor. Thus, it is seen that at least about a 1% additional benefit can be realized for the BLI blade 30.

With reference to FIG. 6, in addition to twist or pitch factor modifications of the BLI blade 30, additional modifications may be made. As shown in FIG. 6, a free stream propeller has a substantially circular inboard end 40 with an initial chord length 41, airfoil camber 42 (which is similar to the chord distribution in this case) and airfoil thickness 43. The BLI blade 30 on the other hand is optimized to provide close to an ideal loading distribution. The BLI blade 30 realizes an increase in performance due to operating on the low velocity air in the boundary layer at the inboard end 301 of the root section 31 where the chord length 302, the airfoil camber 303 and the thickness 304 are increased relative to the characteristics of the inboard end 40 of the free stream propeller. That is, while the initial chord length 41 and the airfoil thickness 43 of the free stream propeller are substantially similar, the chord length 302 is substantially greater than the thickness 304. In addition, while the initial chord length 41 and the airfoil camber 42 of the free stream propeller are substantially similar, straight and parallel with each other, the chord length 302 and the airfoil camber 303 have different lengths and the airfoil camber 303 is curved. This optimization allows the BLI blade 30 to generate more thrust in the boundary layer region 171, which will result in an additional marginal increase in efficiency.

In addition and, in accordance with further embodiments, at least at the root section 31, a maximum thickness location of the root section 31 may be defined at approximately 25% of the chordal length of the root section 31.

In accordance with further aspects of the invention, a method of designing the BLI blade 30 is provided. The method includes forming the BLI blade 30 with the root section 31 being connectable to the hub 32, the tip section 33 being remote from the hub 32 and the body 34 extending in a spanwise dimension from the root section 31 to the tip section 33 and reducing the local pitch of the body 34 from the root section 31 to about the 70% span location to thereby reduce local angles of attack in the boundary layer region 171 defined in and around the root section 31. In accordance with embodiments, the method may further include testing the BLI blade 30 in non-ideal conditions such as where free stream airflow velocities upstream of the BLI blade 30 are non-uniform.

Figure 8:
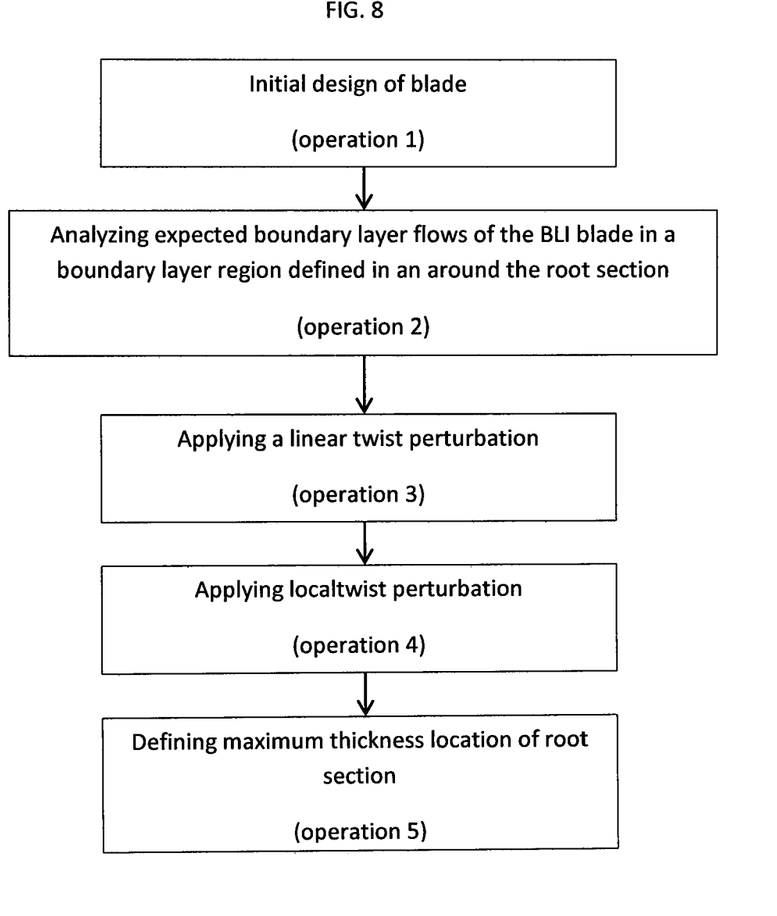
FIG. 8 is a flow diagram illustrating a method of designing a BLI blade.

In accordance with further aspects of the invention and, with reference to FIG. 8, a method of designing a boundary layer ingesting (BLI) blade is provided. As described above, the BLI blade includes a root section, a tip section and a body extending spanwise from the root section to the tip section. As shown in FIG. 8, the method includes initially designing the BLI blade to have a twist distribution of approximately thirty degrees at an approximate 20% span location, approximately zero degrees at an approximate 75% span location and approximately negative eight degrees at an approximate 100% span location (operation 1), analyzing expected boundary layer flows of the BLI blade in a boundary layer region defined in an around the root section (operation 2) and applying a linear twist perturbation to the initially designed BLI blade from the approximate 20% span location to the approximate 100% span location in accordance with results of the analysis to adjust local angles of attack in the boundary layer region (operation 3).

In addition, the method may further include applying a local twist perturbation from an approximate 40% span location to an approximate 90% span location (operation 4) and, where the root section has a chordal length, defining a maximum thickness location of the root section at approximately 25% of the chordal length (operation 5)

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. By way of example, aspects of the invention can be used with pusher-propeller aircraft or unmanned aerial vehicles, propellers on ships, wind turbine propellers, gas turbine blades or other like blades. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A propeller including a hub and at least one boundary layer ingesting (BLI) blade having a span, the at least one BLI blade comprising:
    a root section having an inboard end connected to the hub and an outboard end, the inboard end of the root section having a chordal length and a maximum thickness location defined at approximately 25% of the chordal length;
    a tip section disposable at a distance from the hub and having a twist; and
    a body extending in a spanwise dimension from the outboard end of the root section to the tip section,
    the body having a local twist from the root section to about a 70% span location, which is greater than the twist of the tip section, to thereby reduce local angles of attack in a boundary layer region defined in and around the root section.

2. The propeller according to claim 1, wherein the inboard end of the root section has a chord length that is substantially greater than a thickness thereof and different from an airfoil camber length.

3. The propeller according to claim 1, wherein the inboard end of the root section has a curved airfoil camber.

4. A compound helicopter, comprising:
    a fuselage including a rotor section and a tail section;
    a main rotor blade disposed at the rotor section and configured to rotate relative to the fuselage to provide a lift force; and
    a pusher propeller disposed at the tail section and configured to rotate relative to the fuselage to provide thrust, the pusher propeller comprising:
    a hub;
    a blade comprising a root section having an inboard end connected to the hub and an outboard end, a tip section at a distance from the hub and having a twist and a body extending in a spanwise direction from the outboard end of the root section to the tip section, an inboard end of the root section having a chordal length and a maximum thickness location defined at approximately 25% of the chordal length, the body having a local twist from the root section to about a 70% span location, which is greater than the twist of the tip section to thereby reduce local angles of attack in a boundary layer region defined in and around the root section.

5. The compound helicopter according to claim 4, wherein the fuselage comprises a wake inducing feature upstream from the pusher propeller.

6. The compound helicopter according to claim 4, wherein the fuselage comprises an axisymmetric wake inducing element.

7. The compound helicopter according to claim 4, wherein the blade is a boundary layer ingesting blade.

8. The compound helicopter according to claim 4, wherein the inboard end of the root section has a chord length that is substantially greater than a thickness thereof and different from an airfoil camber length.

9. The compound helicopter according to claim 4, wherein the inboard end of the root section has a curved airfoil camber.

10. A method of designing a boundary layer ingesting (BLI) blade having a span, the method comprising:
    forming a tip section to be remote from a hub, the tip section having a twist;
    forming a root section having an inboard end connectable to the hub and an outboard end, the inboard end of the root section having a chordal length and a maximum thickness location defined at approximately 25% of the chordal length; and,
    forming a body extending in a spanwise dimension from the outboard end of the root section to the tip section, and forming the body to have a local twist which is greater than the twist of the tip section, the body being up to about a 70% span location with the local twist to reduce local angles of attack in a boundary layer region defined in and around the root section.

11. The method according to claim 10, further comprising forming the inboard end of the root section with a chord length that is substantially greater than a thickness thereof and different from an airfoil camber length.

12. The method according to claim 10, further comprising forming the inboard end of the root section with a curved airfoil camber.

13. The method according to claim 10, further comprising testing the BLI blade in non-ideal conditions.

14. The method according to claim 13, wherein the non-ideal conditions comprise non-uniform free stream airflow velocities upstream of the BLI blade.

15. The propeller according to claim 1, wherein the at least one BLI blade is a pusher propeller blade.

16. The method according to claim 10, wherein the blade is a pusher propeller blade.

* * * * *